United States Patent
Guo et al.

(10) Patent No.: US 9,401,925 B1
(45) Date of Patent: Jul. 26, 2016

(54) SYSTEMS AND METHODS FOR DETECTING SECURITY THREATS BASED ON USER PROFILES

(71) Applicant: Symantec Corporation, Mountain View, CA (US)

(72) Inventors: Fanglu Guo, Los Angeles, CA (US); Sandeep Bhatkar, Sunnyvale, CA (US); Kevin Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 392 days.

(21) Appl. No.: 14/024,636

(22) Filed: Sep. 12, 2013

(51) Int. Cl.
H04L 29/06 (2006.01)
G06F 21/56 (2013.01)

(52) U.S. Cl.
CPC ............ *H04L 63/1416* (2013.01); *G06F 21/56* (2013.01)

(58) Field of Classification Search
CPC ... H01L 63/1416; G06F 21/56; G06F 9/4446; A63F 2300/6027
See application file for complete search history.

(56) References Cited

U.S. PATENT DOCUMENTS

| | | | | |
|---|---|---|---|---|
| 7,953,846 B1* | 5/2011 | Amoroso | ................ | G06F 21/57 709/219 |
| 8,776,168 B1* | 7/2014 | Gibson | ................. | H04L 63/104 709/225 |
| 2006/0149738 A1* | 7/2006 | Muralidharan | ......... | G06F 21/55 |
| 2008/0172574 A1* | 7/2008 | Fisher | ..................... | G06Q 10/06 714/25 |
| 2009/0094670 A1* | 4/2009 | Park | ...................... | G06F 21/577 726/1 |
| 2010/0057657 A1* | 3/2010 | Boothe | ..................... | G06N 5/04 706/46 |
| 2010/0169971 A1* | 7/2010 | Raviv | .................... | G06F 21/316 726/23 |
| 2012/0089610 A1* | 4/2012 | Agrawal | ........... | G06F 17/30286 707/741 |
| 2012/0210388 A1* | 8/2012 | Kolishchak | ........... | G06F 21/552 726/1 |
| 2013/0167231 A1* | 6/2013 | Raman | ................ | H04L 63/1416 726/23 |
| 2014/0024348 A1* | 1/2014 | Hurst | ................... | H04M 3/5232 455/414.1 |
| 2014/0230057 A1* | 8/2014 | Berger | .................... | G06F 21/88 726/23 |
| 2015/0142138 A1* | 5/2015 | Mohan | ..................... | G05B 9/02 700/20 |

OTHER PUBLICATIONS

Pannell, Grant et al., "Anomaly Detection over User Profiles for Intrusion Detection", Proceedings of the 8th Australian Information Security Management Conference, Edith Cowan University, Perth Western Australia, (Nov. 30, 2010).

* cited by examiner

*Primary Examiner* — Michael Pyzocha
(74) *Attorney, Agent, or Firm* — ALG Intellectual Property, LLC (57) ABSTRACT

A computer-implemented method for detecting security threats based on user profiles may include 1) identifying behavior on a computing system that is potentially indicative of a security threat, 2) identifying a user profile for a user of the computing system that estimates a level of the user's technical sophistication, 3) comparing the identified behavior with the estimated level of the user's technical sophistication, and 4) determining whether the identified behavior indicates a security threat based at least in part on the comparison of the identified behavior with the estimated level of the user's technical sophistication. Various other methods, systems, and computer-readable media are also disclosed.

20 Claims, 6 Drawing Sheets

SYSTEMS AND METHODS FOR DETECTING SECURITY THREATS BASED ON USER PROFILES

BACKGROUND

In recent years, individuals and organizations have become increasingly concerned with protecting their networks and computing resources from malicious attacks. Malicious attacks on network and computing resources often vary widely in their degree of sophistication and/or complexity. For example, rudimentary or unsophisticated attacks may rely on exploits or attacks that are not especially complex, intelligent, or sophisticated. These attacks are also often fleeting or one-off. Advanced Persistent Threats (APTs), in contrast, often utilize relatively intelligent or sophisticated exploits or attacks that persist over an extended period of time.

While rudimentary or unsophisticated attacks may be relatively easy to identify or detect, network administrators often have trouble identifying or detecting APTs since these attacks often appear to be similar to the behavior of legitimate administrators or technically sophisticated users. For example, APTs may use the same or similar network commands and applications that administrators use to manage networks in an attempt to mask their illegitimate traffic and/or behavior, potentially frustrating the efforts of network administrators to distinguish between the same.

Accordingly, the instant disclosure identifies a need for systems and methods capable of more accurately identifying security threats, especially systems and methods capable of more accurately distinguishing between APTs and the innocuous behavior of technically sophisticated users.

SUMMARY

As will be described in greater detail below, the instant disclosure generally relates to systems and methods for detecting security threats based on user profiles by (1) identifying behavior on a computing system that is potentially indicative of a security threat, (2) identifying a user profile for a user of the computing system that estimates a level of the user's technical sophistication, (3) comparing the identified behavior with the estimated level of the user's technical sophistication, and (4) determining whether the identified behavior indicates a security threat based on the comparison of the identified behavior with the estimated level of the user's technical sophistication.

In some examples, identifying behavior on the computing system that is potentially indicative of a security threat may include identifying use of an administrative tool that causes remote execution on other computing systems, execution of a network command that allows attackers to identify domain controllers and/or accounts with domain administrator credentials, compromising of a machine by accessing system logs, internal reconnaissance by commands that list out network information, lateral movement by commands for remote services, and/or data exfiltration through file transfer protocols and/or file compression applications.

In some embodiments, identifying the user profile that estimates the level of the user's technical sophistication may include adjusting the user profile. Adjusting the user profile may include increasing the estimated level of the user's technical sophistication based on use of a command line interface.

In some embodiments, adjusting the user profile may include increasing the estimated level of the user's technical sophistication based on the use of system administrative tools. Adjusting the user profile may also include increasing the estimated level of the user's technical sophistication based on the presence of development tools and/or scripting tools. In addition, adjusting the user profile may include increasing the estimated level of the user's technical sophistication based on a ratio of time spent within a web browser to time spent within other user-installed applications.

In some embodiments, identifying the user profile that estimates the level of the user's technical sophistication may include categorizing the user within a class of users and then identifying an average profile for users within that class of users.

In some examples, determining whether the identified behavior indicates a security threat may include determining that the identified behavior does not indicate a security threat. Determining that the identified behavior does not indicate a security threat may include determining that the user was physically present at the computing system during the identified behavior and/or that the user witnessed changes made by the identified behavior. In addition, determining that the identified behavior does not indicate a security threat may include determining that behavior similar to the identified behavior occurred on other network computing systems during the same period of time as the identified behavior. Determining that the identified behavior does not indicate a security threat may also include identifying a false positive.

In one example, a system for implementing the above-described method may include (1) an identification module that identifies behavior on a computing system that is potentially indicative of a security threat and that identifies a user profile for a user of the computing system that estimates a level of the user's technical sophistication, (2) a comparison module that compares the identified behavior with the estimated level of the user's technical sophistication, (3) a determination module that determines whether the identified behavior indicates a security threat based on the comparison of the identified behavior with the estimated level of the user's technical sophistication, and (4) at least one processor configured to execute the identification module, the comparison module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify behavior on a computing system that is potentially indicative of a security threat, (2) identify a user profile for a user of the computing system that estimates a level of the user's technical sophistication, (3) compare the identified behavior with the estimated level of the user's technical sophistication, and (4) determine whether the identified behavior indicates a security threat based on the comparison of the identified behavior with the estimated level of the user's technical sophistication.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting security threats based on user profiles. As will be explained in greater detail below, the systems and methods described herein may enable security systems to more accurately identify security threats. In particular, by comparing the level of technical sophistication indicated by behavior on a computing system with an expected level of technical sophistication for a user of the computing system, the disclosed systems and methods may identify deviations from expected behavior that indicate, or increase the odds, of a security threat.

Figure 1:
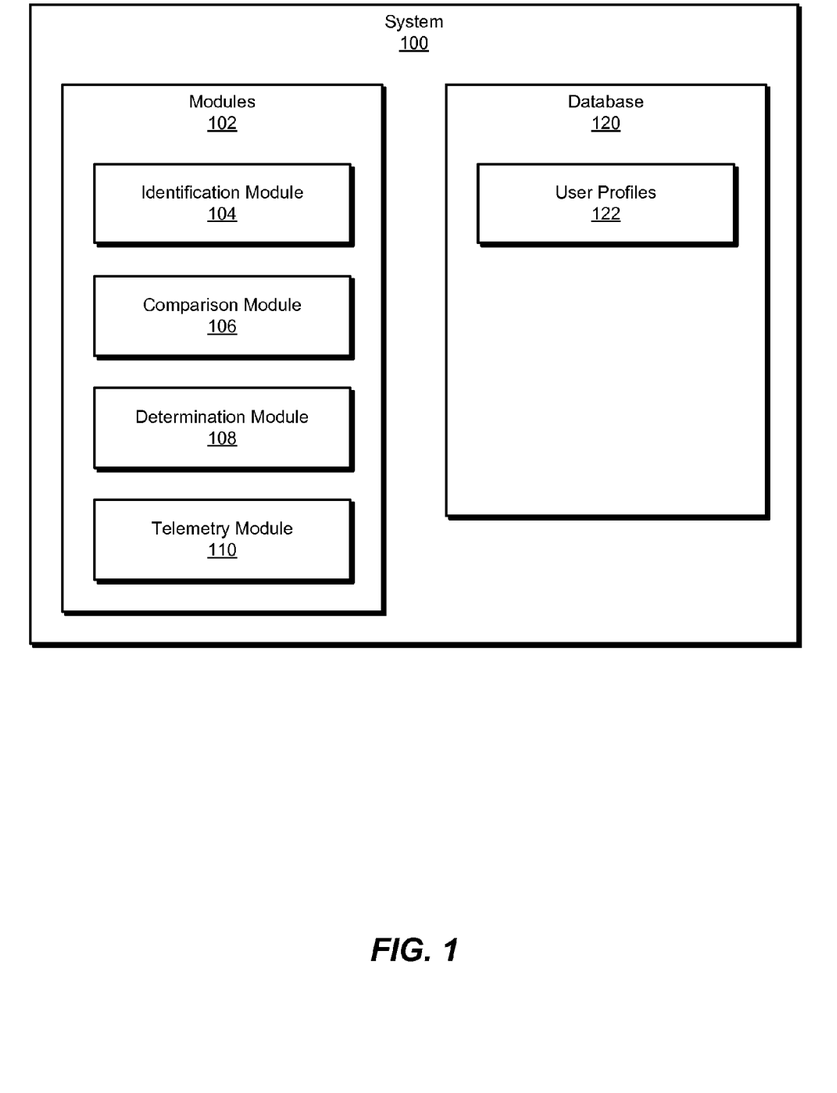
FIG. 1 is a block diagram of an exemplary system for detecting security threats based on user profiles.
Figure 2:
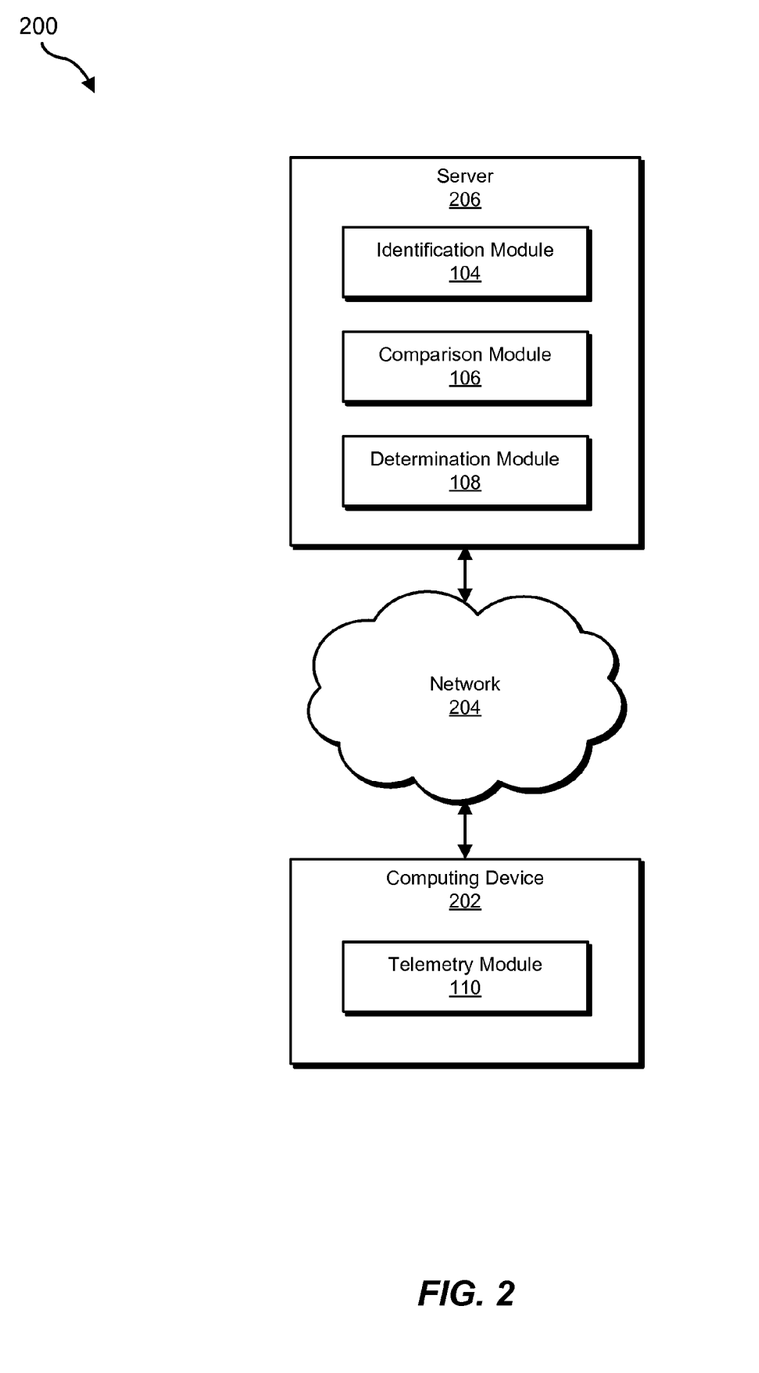
FIG. 2 is a block diagram of an exemplary system for detecting security threats based on user profiles.

The following will provide, with reference to FIGS. 1-2, detailed descriptions of exemplary systems for detecting security threats based on user profiles. Detailed descriptions of corresponding computer-implemented methods will also be provided in connection with FIG. 3. Moreover, detailed descriptions of an exemplary system, and corresponding data flow, will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting security threats based on user profiles. As illustrated in this figure, exemplary system 100 may include one or more modules 102 for performing one or more tasks. For example, and as will be explained in greater detail below, exemplary system 100 may include an identification module 104 that may identify behavior on a computing system that may be potentially indicative of a security threat. Identification module 104 may also identify a user profile for a user of the computing system that estimates a level of the user's technical sophistication. Exemplary system 100 may additionally include a comparison module 106 that may compare the identified behavior with the estimated level of the user's technical sophistication.

Exemplary system 100 may also include a determination module 108 that may determine whether the identified behavior indicates a security threat based on the comparison of the identified behavior with the estimated level of the user's technical sophistication. In addition, exemplary system 100 may include a telemetry module 110 that may provide telemetry and other data from client systems to a server. As discussed in greater detail below, this telemetry data may include data on what behaviors, commands, applications, software, and/or hardware are associated with, performed by, installed by, and/or used by users at the client systems (including data uniquely or non-uniquely identifying users and attributes of users, including job, rank, and/or security clearance).

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, and as will be described in greater detail below, database 120 may be configured to store information about commands, including network and/or application commands, including a recorded history of who executed one or more commands (and other details including timing of the commands and parameters). Database 120 may also be configured to store information about the persons who execute commands, including their status (i.e., within a business hierarchy), their designated or estimated level of technical sophistication, their security clearance level, their expected behavior, and their job titles, duties, and descriptions. In addition, database 120 may store information about users within respective user profiles 122. Database 120 may also store correlations (binary or probability-based) between commands and degrees or classifications of technical sophistication of users who tend (statistically) to use those commands. Comparison module 106 and determination module 108 may use any of these items of information to perform steps 306 and 308 of method 300 in FIG. 3, as described below (and in accordance with the spirit of that disclosure).

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in detecting security threats based on user profiles. For example, and as will be described in greater detail below, identification module 104 may be programmed to identify behavior on a computing system (e.g., computing device 202) that is potentially indicative of a security threat. Identification module 104 may also be programmed to identify a user profile (e.g., within database 120) for a user of the computing system that estimates the user's level of technical sophistication. In addition, comparison module 106 may be programmed to compare the identified behavior with the estimated level of the user's technical sophistication. Finally, determination module 108 may be programmed to determine whether the identified behavior indicates a security threat based on the comparison of the identified behavior with the estimated level of the user's technical sophistication.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of detecting security threats based on user profiles. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
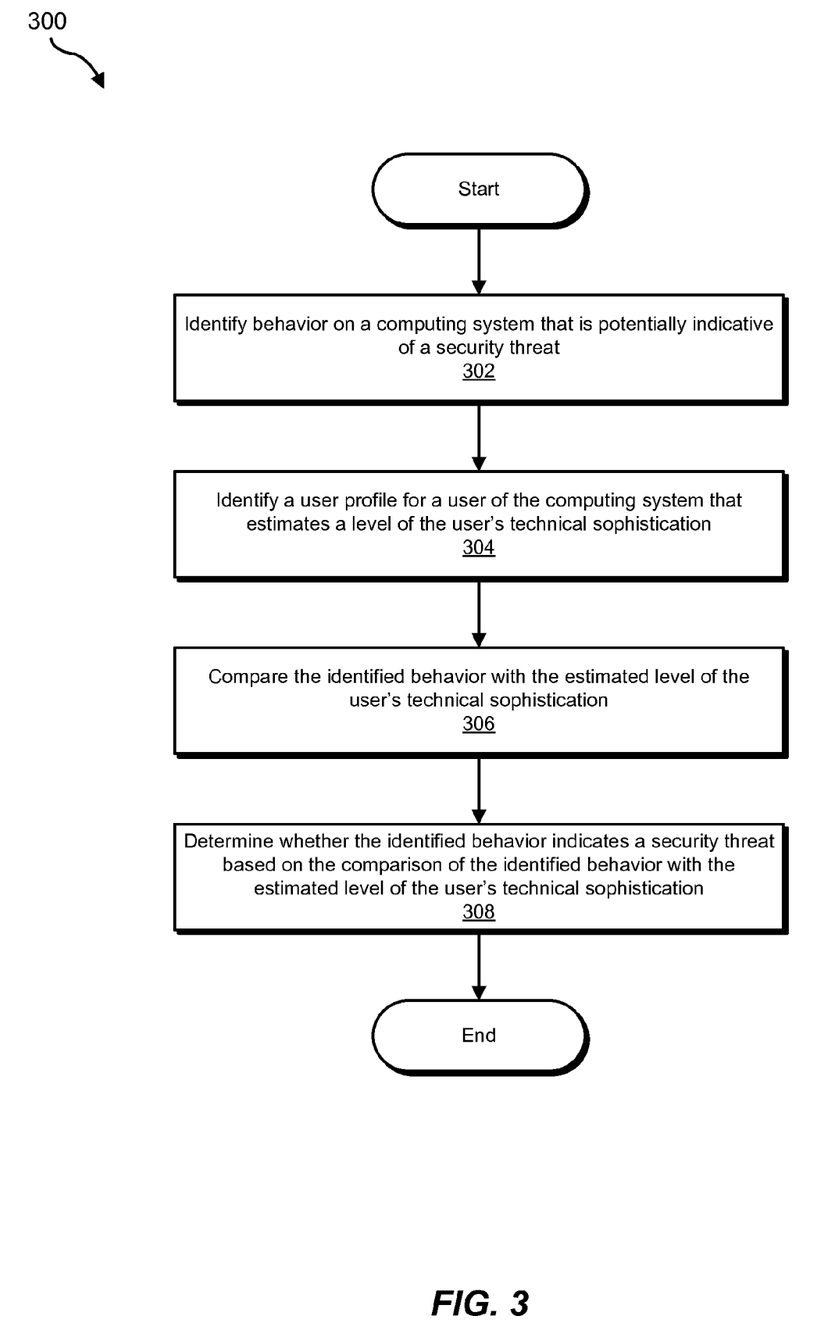
FIG. 3 is a flow diagram of an exemplary method for detecting security threats based on user profiles.

FIG. 3 is a flow diagram of an exemplary computer-implemented method 300 for detecting security threats based on user profiles. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify behavior on a computing system that is potentially indicative of a security threat. For example, identification module 104 may, as part of computing device 202 in FIG. 2, identify behavior on computing device 202 that is potentially indicative of a security threat.

Identification module 104 may identify behavior in a variety of ways. For example, identification module 104 may monitor behavior on computing device 202. Identification module 104 may also receive a message, report, and/or flag about the behavior.

Upon learning about or discovering the behavior, identification module 104 may determine that the behavior potentially indicates a security threat. For example, identification module 104 may match the behavior to behavior that is known to potentially indicate a security threat. In addition, identification module 104 may correlate security threats with user behavior that is associated with security threats. Examples of user behavior that may be associated with security threats include user behavior statistically associated with the same or related timing, system, or location of a security threat, commands executed by the behavior, and/or applications installed or executed by the behavior. Although this user behavior may appear to be exhibited by a human user (e.g., an authorized human user), in some examples the behavior may be executed by a hacker, intruder, malware or rogue script, macro, and/or executable, as further discussed below.

Alternatively, identification module 104 may determine that the behavior is potentially indicative of safe or innocuous behavior by a technically sophisticated user. In some examples, this indication may be "tentative" because system 100 might have yet to distinguish between a security threat and innocuous behavior by a sophisticated user (or have yet to assign probabilities to one or both possibilities). The indication may also be "tentative" simply because system 100 has not confirmed, or made a final determination, that the behavior does indicate a security threat, as detailed below.

In some examples, identification module 104 may determine that the behavior is potentially indicative of a security threat by determining that the behavior includes, involves, and/or implicates (1) the use of an administrative tool that causes remote execution on other computing systems, (2) the execution of a network command that allows attackers to identify domain controllers and/or accounts with domain administrator credentials, (3) compromising of a machine by accessing system logs, (4) internal reconnaissance by commands that list out network information, (5) lateral movement by commands for remote services, and/or (6) data exfiltration through file transfer protocols (FTP) and/or file compression applications.

Examples of administrative tools that cause remote execution on other computing systems include, without limitation, PSEXEC, REMOTE DESKTOP, and VIRTUAL NETWORK COMPUTING, and any other application that causes remote execution on other computing systems. Similarly, examples of network commands, utilities, and/or applications that may allow attackers to identify domain controllers and/or administrator accounts include, without limitation, NETSTAT, NETCAT, NMAP, WIRESHARK, METASPLOIT, as well as any network commands, utilities, and/or applications that perform host discovery, port scanning, version detection, operating system detection, security auditing, open port identification, network inventory, network mapping, new server discovery, and/or target system reconnaissance (including scriptable interaction with a target system, reverse DNS lookup, device type lookup, and/or MAC address lookup).

In addition, examples of behavior that implicates or involves the compromise of a machine include, without limitation, behavior that involves accessing, modifying, and/or deleting system logs. Similarly, examples of behavior that involves internal reconnaissance include, without limitation, commands that list out domain administrators, list domain controllers, that identify other machines in the network (such as NETSTAT or TCPDUMP), and/or that grab recently accessed documents from the operating system registry or the recently accessed documents item in the computing system's filesystem (e.g., in WINDOWS: "c:\Documents and Settings\USER\My Recent Documents"). In addition, examples of behavior that involves lateral movement include, without limitation, commands that launch remote services (e.g., PSEXEC and WINDOWS MANAGEMENT INSTRUMENTATION) and/or remote login commands (e.g., REMOTE DESKTOP and VIRTUAL NETWORK COMPUTING). Finally, examples of behavior that involves sensitive data exfiltration include, without limitation, behavior that involves the installation of an FTP server, use of FTP from a command prompt, and/or installation of WINRAR or 7ZIP or another compression tool, especially if used to create encrypted compression files.

At step 304, the systems described herein may identify a user profile for a user of the computing system that estimates a level of the user's technical sophistication. For example, identification module 104 may, as part of computing device 202 in FIG. 2, identify a user profile (e.g., within database 120) for a user of computing device 202 that estimates the user's level of technical sophistication.

In general, identification module 102 may identify or estimate a match or correlation between the identified behavior and a user of the computing system where the behavior occurred. For example, identification module may correlate the identified behavior with a user, human, user account, administrative account, owner, and/or licensee of the computing system, using any suitable identification information (e.g., user name, legal name, user account name, registration number, licensee number, etc.).

Identification module 104 may identify the user profile in a variety of ways. For example, identification module 104 may retrieve the profile from a database, such as database 120. Identification module 104 may also identify the profile by generating (originally or repeatedly) the profile.

In some examples, identification module 104 may identify the user profile that estimates the level of the user's technical sophistication in part by adjusting the user profile. As used herein, the phrase "adjusting the profile" may refer to adjusting part of a profile during the original creation of the profile. "Adjusting the profile" may also refer to adjusting part of a profile that is already created. In one example, identification module 104 may adjust a level of the user's technical sophistication by increasing or decreasing one or more values along one or more ranges that represent levels of technical sophistication.

Figure 4:
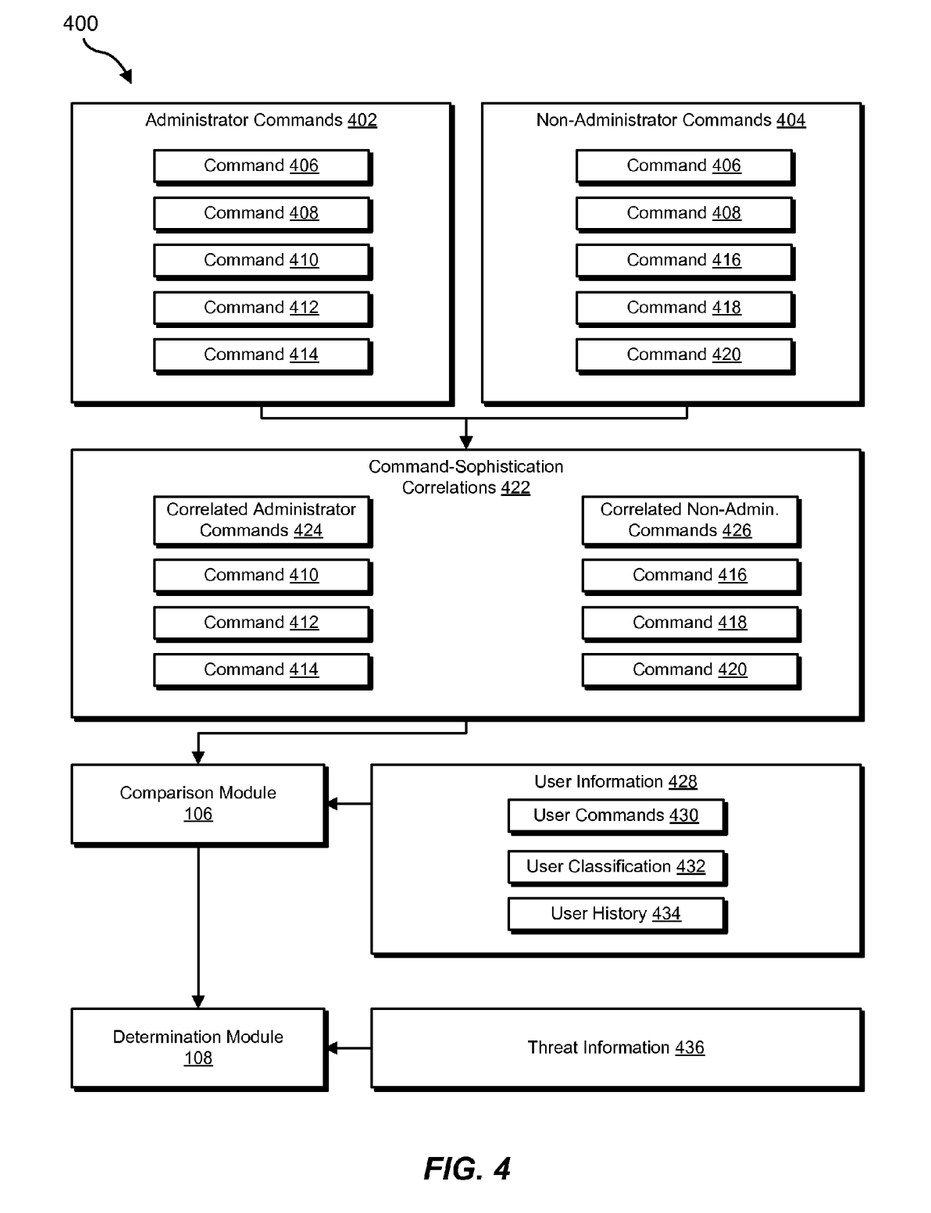
FIG. 4 is a block diagram of an exemplary system for detecting security threats based on user profiles.

FIG. 4 shows an exemplary system 400, and corresponding flow of data, that illustrates how identification module 104 may identify the profile. Before discussing the specifics of how identification module 104 may identify the profile, the following discussion will provide some background about system 400 and its operation.

As illustrated in FIG. 4, system 400 may include a plurality of administrator commands 402, including commands 406, 408, 410, 412, and 414. System 400 may also include a plurality of non-administrator commands 404, including commands 406, 408, 416, 418, and 420. The term "administrator command," as used herein, generally refers to commands recorded by users who are known or estimated to be administrators. In contrast, the term "non-administrator command," as used herein, generally refers to commands recorded by users who are known or estimated to not be administrators.

In some embodiments, identification module 104, or another module within system 100, may correlate commands with classifications of users who are statistically associated with those classifications. These classifications may indicate a degree of technical sophistication of the users who executed the commands. For example, identification module 104 may create command-sophistication correlations 422. Command-sophistication correlations 422 may correlate commands 410, 412, and 414 with correlated administrator commands 424. These correlations may represent the fact that commands 410, 412, and 414 are recorded within, or associated with, administrator commands 402. Similarly, command-sophistication correlations 422 may also correlate commands 416, 418, and 420 with correlated non-administrator commands 426. These correlations may represent the fact that commands 416, 418, and 420 are recorded within, or associated with, non-administrator commands 426.

In the example of FIG. 4, correlated administrator commands 424 include commands that are included within administrator commands 402 but not non-administrator commands. Similarly, correlated non-administrator commands 426 include commands that are included within non-administrator commands 404 but not administrator commands 402. In contrast, commands 406 and 408 are associated with both administrator commands 402 and non-administrator commands 404, and, therefore, are not included within command-sophistication correlations 422. Although in the example of FIG. 4 the users are divided into two groups (administrators and non-administrators), users may be divided into any arbitrary number of groups or classifications, each of which may indicate a degree of technical sophistication. In addition, while system 400 records "commands" that are executed by administrators and non-administrators, system 400 may also record any behavior or properties of relevance, including the timing of behavior, location of behavior, patterns of behavior, installation of an application, execution of an application, and/or any other usage patterns.

In some examples, system 400 may correlate these aspects of recorded behavior with the technical sophistication of the users who tend to exhibit that behavior. The correlations may include binary correlations, as with command-sophistication correlations 422, or probabilistic correlations. System 400 may also correlate user behavior (i.e., any particular action, group of actions, or pattern of actions) with an estimated degree of technical sophistication of the user or users who exhibit that behavior, without grouping those users into a separate group.

Although not shown in FIG. 4, identification module 104 may also create average profiles for different groups of classifications of users. For example, identification module 104 may identify a profile for a user in part by categorizing the user within a class of users and then identifying an average profile for users within that class of users. In one embodiment, identification module 104 may create an average profile of an administrator based on the recorded behavior of all (or some, most, or substantially all) recorded administrators. Similarly, identification module 104 may create an average profile for a non-administrator in the same manner. Identification module 104 may also create an average profile for any other group or classification of users, which may indicate average, normal, and/or expected behavior for users within that group or classification. This average profile may also indicate the timing or location of behavior, such as executed commands, executed or installed applications, and/or any other usage or behavioral pattern. Lastly, identification module 104 may generate a score indicating a degree to which the user matches the average profile of a class of users (e.g., sophisticated users identified by some threshold of sophistication, administrators, etc.). The disclosed systems and methods may then use the score as a multiplier to determine how likely it is that a security threat is indicated or detected.

Although in the example of FIG. 4 command-sophistication correlations 422 correlate commands with a user classification (i.e., administrator or non-administrator) when users of a particular classification use that command exclusively (e.g., only administrators are recorded as executing command 410), identification module 104 may correlate commands with classifications even when multiple classifications use the command. For example, both administrators and non-administrators may execute command 406. Identification may therefore correlate command 406 with neither administrators nor non-administrators (as in FIG. 4) or with both. In another example, if administrators use command 406 ten times more frequently than non-administrators, then identification module 104 may correlate command 406 with both administrators and non-administrators, but weight the correlation more strongly (i.e., ten times more strongly) for administrators than for non-administrators. Identification module 104 may use any Boolean logic, business logic, or other suitable logic for weighting different correlations. The weighting need not be identical or linear to the statistical frequency of how often behavior is associated with a particular group or classification.

With the above background in mind, the following provides an overview of how identification module 104 may identify the profile of the user. As shown in FIG. 4, system 400 may include user information 428, which may correspond to the user's profile. In some examples, user information 428 may include user classification 432. In other words, a classification of the user may be provided to identification module 104 (or other suitable module) by the user, by the user's business or organization (or another business or organization), by another user, and/or by an administrator (e.g., manually). This classification may be provided in response to a prompt that requests the classification from the user, other user, and/or administrator. In some examples, identification module 104 may first verify that the person entering the classification is authorized to do so.

In some embodiments, user classification 432 may identify the user as a member of a group, such as administrators or non-administrators. User classification 432 may also simply indicate an estimated level of technical sophistication of the user. For example, user classification 432 may provide a technical sophistication score, rating, and/or grouping for the user using any numeric value along an arbitrary scale that indicates technical sophistication from lesser to greater.

In some examples, identification module 104 may also read an organization or business listing, map, or hierarchy (or other document) to identify a person's rank or title within the organization or business. Identification module 104 may then correlate the rank or title with an estimated level of technical sophistication (e.g., using a map that maps ranks or titles to estimated levels of technical sophistication). Identification module 104 may similarly map security clearance levels to estimated levels of technical sophistication.

In some embodiments, instead of retrieving a previously created user classification, identification module 104 may newly generate the user profile, including user classification 432. For example, identification module 104 may access user history 434, which may indicate a history of user behavior, including executed commands. The recorded executed command may be analogous to the recorded commands of administrators in administrator commands 402 and of non-administrators in non-administrator commands 404. In these embodiments, identification module 104 may focus upon the entirety of the user's history or only a selected subset or group of subsets within the user's history. Identification module 104, comparison module 106, and/or another suitable module may then compare the user behavior in user history 434 with those in administrator commands 402, non-administrator commands 404, and/or command-sophistication correlations 422. Identification module 104 may thereby match the user, based on user history 434, to the group of administrators or the group of non-administrators (e.g., by determining that user history 434 is more similar to one group than another group).

In some examples, identification module 104 may compute a degree of similarity (e.g., as a numeric point along an arbitrary scale) between user history 434 and behavior by administrators, non-administrators, and/or any other group of persons (e.g., differentiated according to estimated levels of technical sophistication). Identification module 104 may similarly compare user history 434 with one or more ideal, average, and/or representative profiles for a corresponding group or classification of users (e.g., administrators and non-administrators, etc.) to compute a degree of similarity and/or classify the user.

In some embodiments, identification module 104 may adjust the user profile based on the estimated level of technical sophistication to indicate that the user is estimated to be more, or less, technically sophisticated. In general, identification module 104 may adjust the user profile to a degree that is proportionate to, or corresponds to, a degree to which the user is estimated to be (more or less) technically sophisticated.

In some examples, identification module 104 may adjust the user profile in part by increasing the estimated level of the user's technical sophistication based on the use of a command line interface. For example, the use of a command line interface may be statistically (or otherwise) associated with administrators and/or technically sophisticated users (e.g., as command 410).

In some examples, identification module may adjust the user profile in part by increasing the estimated level of the user's technical sophistication based on the user's use of system administrative tools. For example, the use of a command line interface may be statistically (or otherwise) associated with administrators and/or technically sophisticated users (e.g., as command 412). As such, identification module 104 may increase a user's estimated level of technical sophistication upon detecting the user's use of such an administrative tool.

In some embodiments, identification module may adjust the user profile in part by increasing the estimated level of the user's technical sophistication based on the user's use of development tools and/or scripting tools. Examples of development tools and/or scripting tools include, without limitation, VBScript, CYGWIN, WINPCAP, and/or similar development and scripting tools. As with administrative tools, the use of one or more of these tools may be statistically (or otherwise) associated with administrators and/or technically sophisticated users (e.g., as command 414).

In some examples, identification module 104 may adjust the user profile in part by increasing the estimated level of the user's technical sophistication based on a ratio of time spent within a web browser to time spent within other user-installed applications. Technically sophisticated users may be more likely (e.g., statistically) to spend time within non-browser (user-installed or otherwise installed) applications. In general, technically sophisticated users may spend proportionately less time within applications that have a wider user base and/or less technically sophisticated users, such as word document processors, media and multimedia players, and/or games (e.g., relative to other programs with narrower user bases or more technically sophisticated user bases). As such, identification module 104 may use a map that correlates different programs with degrees or categories of technical sophistication (e.g., of their user base) and adjusts user profiles based on the ratio (or ratios) of time spent using commands or applications within varying degrees or classifications of technical sophistication.

Returning to FIG. 3, at step 306 the systems described herein may compare the identified behavior with the estimated level of the user's technical sophistication. For example, comparing module 106 may, as part of computing device 202 in FIG. 2, compare the identified behavior with the estimated level of the user's technical sophistication.

Comparison module 106 may compare the identified behavior with the estimated level of the user's technical sophistication in a variety of ways. In the example of FIG. 4, user commands 430 may correspond to the identified behavior, and may indicate a current or recent set of user commands (or user behavior more generally) under consideration by comparison module 106. In this example, comparison module 106 may compare user commands 430 with user classification 432, which may indicate one or more binary classifications of the user and/or may indicate one or more degrees of technical sophistication, as described above in connection with step 304.

In view of the above, comparison module 106 may compare the identified behavior with an estimated level of the user's technical sophistication that is based on (1) the user's previous behavior, (2) derived without consideration of the user's previous behavior (e.g., methods based on manual entry and organization rank, as discussed above), or (3) a combination of both. In the latter case, both comparisons may be weighted equally or differently in determinations such as step 308, as discussed below.

The systems and methods disclosed herein may provide improve over other methods by (1) comparing behavior of a computing system with an estimated level of technical sophistication that is based on previously comparing the user's earlier behavior with the behavior of other users (i.e., known technical sophisticated and/or unsophisticated users), (2) comparing the behavior with an estimated level of technical sophistication by comparing the behavior to behavior of other users (i.e., known technical sophisticated and/or unsophisticated users) that are known to have levels of technical sophistication that correspond to, or resemble, the user's expected or designated level of technical sophistication (e.g., as a binary category or according to a degree along a scale), (3) comparing the behavior with an estimated level of technical sophistication without comparing the behavior to earlier behavior (i.e., without considering the user's earlier behavior), (4) comparing the behavior with an estimated level of technical sophistication as a separate or additional comparison from comparing the user's (overall or other) behavior to the user's (overall or other) previous behavior (e.g., and weighting the two comparison separately or differently), (5) adding a result of the comparison of the behavior with an estimated level of technical sophistication as one or more weighted inputs to a larger overall comparison of the behavior with the user's earlier behavior or expected or predicted behavior, (6) comparing the behavior to the behavior of other users who are expected to have proportionately or expectedly similar, or different, behavior than the user, (7) limiting the comparison of the behavior with earlier behavior to earlier behavior that indicates the user's level of technical sophistication (or lowering a weighting of comparisons of old and new behavior that do not indicate a level of the user's technical sophistication), (8) generating a single or multiple separate scores, values, and/or ranges indicating the user's estimated level of technical sophistication along an overall scale or along one or more technical dimensions (e.g., with certain technical fields and sub-fields), (9) limiting (or lowering a threshold for triggering) comparison of the behavior with earlier behavior based on (e.g., in proportion to) the user behavior appearing to be technically sophisticated and/or potentially indicative of an APT (e.g., meeting a threshold of technical sophistication), and/or (10) estimating a level of sophistication (e.g., assigning a specific score) to a specific command or application, and performing steps 306 and/or 308 based on the user executing the command having the estimated level of sophistication (e.g., determining a degree of deviation, by executing the command, from an expected, predicted, or known degree of technical sophistication of the user).

More generally, the disclosed systems and methods may (1) assign or infer a degree (binary or more finely grained) of technical sophistication to behavior (e.g., executing a particular command, installing, executing, and/or configuring a particular application, using a particular administrative tool, and/or modifying settings), (2) assign or infer a degree of technical sophistication to a user, (3) associate behavior with a user by determining that the behavior was exhibited on a computing system, user account, and/or application owned, managed, administered, and/or generated by (or otherwise associated with) the user, and/or (4) compare the degree of technical sophistication of the user behavior with the estimated degree of technical sophistication of the user.

Returning to FIG. 3, at step 308 the systems described herein may determine whether the identified behavior indicates a security threat based at least in part on the comparison of the identified behavior with the estimated level of the user's technical sophistication. For example, determination module 108 may, as part of computing device 202 in FIG. 2, determine whether the identified behavior indicates a security threat based at least in part on the comparison of the identified behavior with the estimated level of the user's technical sophistication.

Determination module 108 may perform the determination at step 308 in a variety of ways. In general, determination module 108 may increase the likelihood of determining that the identified behavior indicates a security threat based on (e.g., in proportion to) the behavior being inconsistent with a known, designated, predicted, estimated, and/or previous level of technical sophistication for the user. Conversely, determination module 108 may decrease this likelihood in proportion to the behavior being consistent.

In some embodiments, the systems described herein may arbitrarily weight the result of the comparison at step 306 in the determination at step 308. For example, some behavior may strongly indicate a security threat, even if the behavior is consistent with the user's known technical sophistication. Likewise, some behavior may generally not indicate a security threat, but may do so if the behavior is radically inconsistent with the user's known level of technical sophistication. Determination module 108 may weight the result of comparison step 306 arbitrarily or in proportion to the degree to which the behavior is known to indicate a security threat in an overall sense (i.e., regardless of how consistent the behavior is with the user's technical sophistication). In other words, determination module 108 may weight the result of comparison step 306 differently based on the particular security threat or threats under consideration. In some embodiments, information about the security threat, which may be input to determination module 108 in addition to the result of comparison step 306, may include threat information 436 in FIG. 4.

In some examples, the systems described herein may determine that the identified behavior does not indicate a security threat if the user was physically present at the computing system during the identified behavior. In other words, determination module 108 may weight a degree of inconsistent behavior less if the user was physically present since the user's physical presence indicates that the behavior was more likely to be safe or innocuous (i.e., because the behavior, which may include user account behavior, is more likely to indicate a security threat when the user is not physically present).

Similarly, the systems described herein may determine that the identified behavior does not indicate a security threat if the user witnessed changes made by the identified behavior. For example, determination module 108 may distinguish between tools and applications that allow the user to witness changes (e.g., changes made remotely), such as REMOTE ASSISTANCE or WEBEX, from tools and applications that do not allow the user to witness changes, such as PSEXEC.EXE or REMOTE DESKTOP. The former type of applications may have a lower likelihood of indicating that the behavior indicates a security threat.

In some examples, determination module 108 may determine that the identified behavior does not indicate a security threat in part by determining that behavior similar to the identified behavior occurred on other network computing systems during the same period of time as the identified behavior. For example, the fact that behavior similar to the identified behavior occurred on other network computing systems during the same period of time as the identified behavior may indicate that the behavior was part of a system or network-wide update as opposed to a narrowly tailored APT. Because threats might not be narrowly tailored, however, determination module 108 may also omit this feature.

In general, determination module 108 may determine that the identified behavior does not indicate a security threat in part by identifying a false positive. In each of the above examples (i.e., when the user is physically present, when the user witnessed the identified changes, when the identified behavior also occurred on other systems, etc.), additional factors may override an initial determination that the identified behavior is inconsistent with the user's known or expected level of technical sophistication and/or indicates a security threat. For example, determining that the user is physically present, or that the user witnessed the changes, may convert a candidate positive into a false positive, thereby enabling the disclosed systems and methods to infer that the executed commend was authorized, even if the command appears to be associated with an unsophisticated user.

As detailed above, the disclosed systems and methods may profile users to identify their level of technical sophistication, as unsophisticated users are most often targeted by APTs for initial spearphishing attacks. For example, a sudden burst of sophisticated behavior that is consistent with an APT may be more suspicious on the machine of a technically unsophisticated user than on the machine of an Information Technology (IT) user or even on a developer's machine, and the disclosed systems and methods may score these events appropriately.

Targeted and Advanced Persistent Threats may disguise their traffic and behavior to blend into corporate network traffic (or Internet Service Provider traffic, in the case of consumers) by using tools and behaviors that are normal for technically sophisticated users, such that their traffic blends in with the expected behavior of such users when seen on the network. However, APTs often prefer to target individuals that have low levels of technical sophistication, as they are more vulnerable to spearphishing attempts, and perform tasks that require a significant level of technical know-how. As such, the systems and methods disclosed herein may use this knowledge to identify deviations from expected behavior that indicate, or increase the odds, of a security threat.

For example, the disclosed systems and methods may identify anomalous behavior and system traffic based on deviation from a profile of a user's technical sophistication. The following examples of APT behavior are unusual for non-IT personnel: use of administrative tools (such as PSEXEC) to cause remote execution on other machines, and use of NETSTAT, NMAP, NET, and other commands that allow attackers to identify domain controllers and accounts with domain administrator credentials. In the enterprise, these systems and methods may profile users across all devices for which they use a shared account. In a consumer scenario, these systems and methods may identify all devices that connect to a shared router.

The systems and methods disclosed herein may base profiles on multiple factors, including the use of a command line interface, the use of system administrative tools, the presence of development and scripting tools (e.g., VBScript, CYGWIN, WINPCAP, etc.), the percentage of time spent in a web browser versus document editing tools or programs or applications that a user has chosen to install, etc. In addition, false positives resulting from the assistance of IT personnel or a sophisticated friend to an unsophisticated user may be dealt with by incorporating knowledge of whether (1) a burst of APT-consistent activity occurred when the user was present (i.e., was recently seen to be using the mouse/keyboard), as opposed to during the nighttime or on a weekend, (2) the identified activity involved the use of a tool that allowed the user to witness the changes (e.g., via remote assistance or WEBEX as opposed to PSEXEC or REMOTE DESKTOP), and/or (3) whether similar behavior occurred at the same time on other machines on the network (e.g., resulting from a software update or patch pushed out by IT).

In sum, and as detailed above, the systems and methods described herein may enable security systems to more accurately identify security threats. In particular, by comparing the level of technical sophistication indicated by behavior on a computing system with an expected level of technical sophistication for a user of the computing system, the systems and methods may identify deviations from expected behavior that indicate, or increase the odds, of a security threat.

Figure 5:
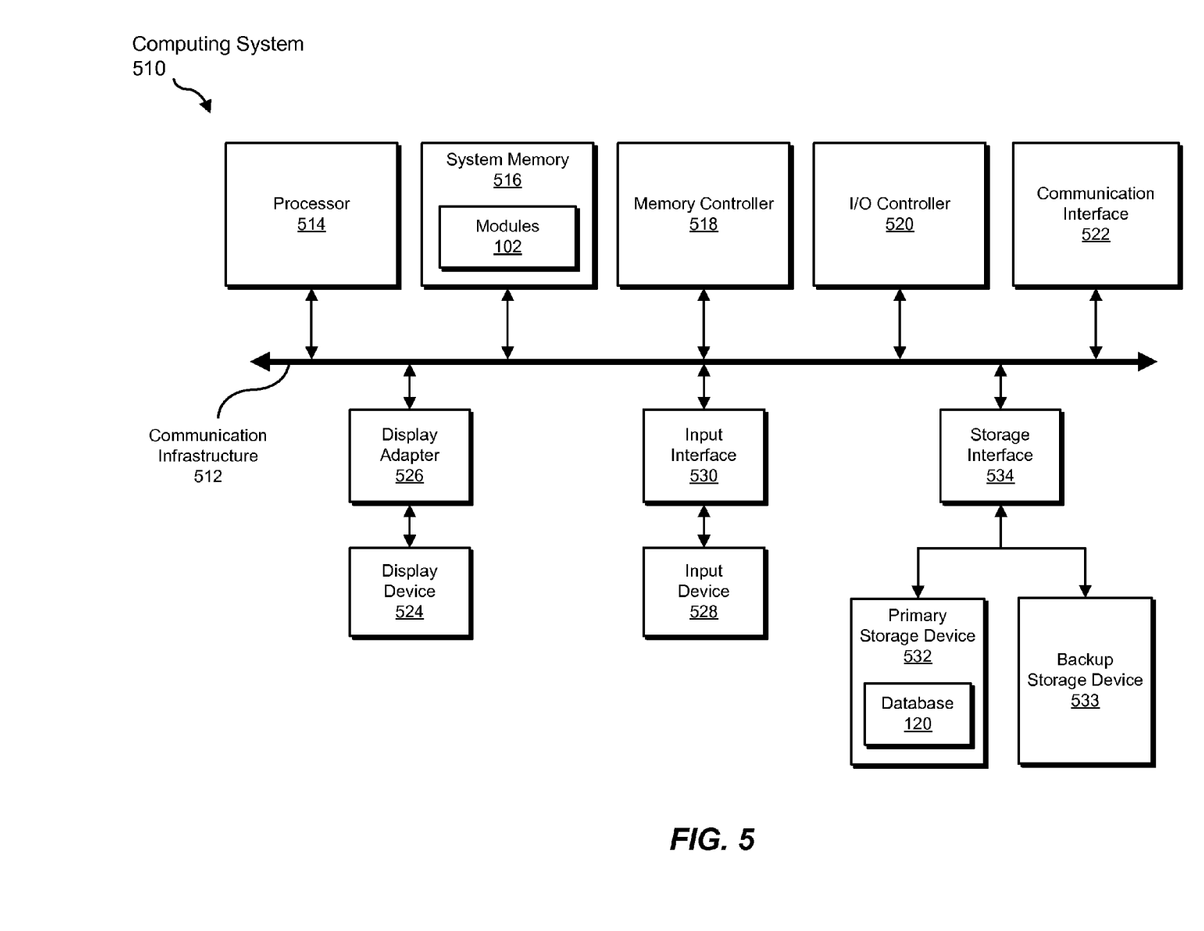
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
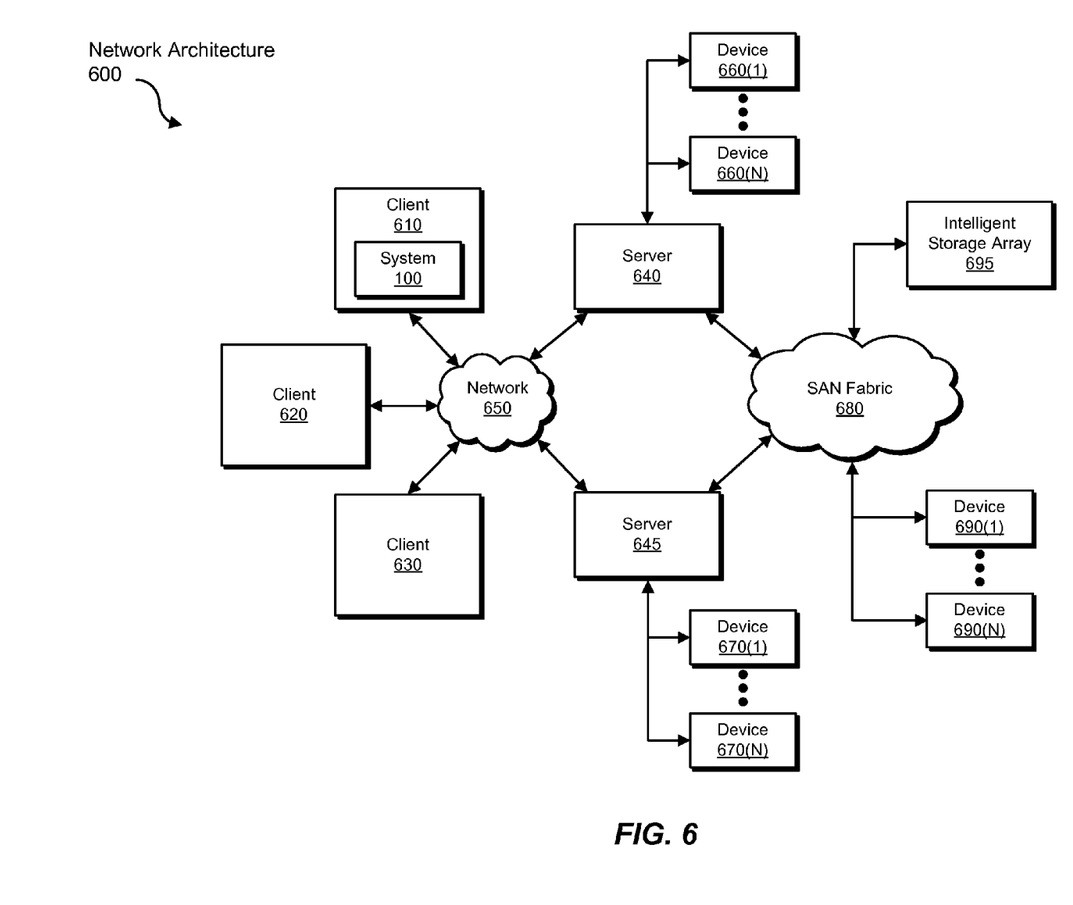
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting security threats based on user profiles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an indication of user behavior or a potential security threat to be transformed, transform the indication into a final determination of whether a security threat exists, output a result of the transformation to an output device like a monitor, prompt or autonomously take remedial action in response to the determination, use the result of the transformation to resolve the security threat, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting security threats based on user profiles, at least a portion of the method being performed by a computing device comprising at least one processor, the method comprising:
   identifying behavior by a user on a computing system that is potentially indicative of a security threat by identifying at least one of:
      use of an administrative tool that causes remote execution on other computing systems;
      execution of a network command that allows attackers to identify at least one of domain controllers and accounts with domain administrator credentials;
   identifying a profile for the user that estimates a level of the user's technical sophistication at least in part by:
      accessing a history of behavior by the user;
      matching the user, by analyzing the history of behavior, to a group of non-administrators having a lower level of technical sophistication than a group of administrators;
   comparing the identified behavior of the user with the estimated level of the user's technical sophistication;
   determining that the identified behavior of the user indicates a security threat at least in part by determining that the identified behavior is inconsistent with the estimated level of the user's technical sophistication associated with the group of non-administrators.

2. The computer-implemented method of claim 1, wherein identifying behavior by the user on the computing system that is potentially indicative of a security threat comprises identifying:
   execution of the network command that allows attackers to identify at least one of domain controllers and accounts with domain administrator credentials.

3. The computer-implemented method of claim 1, further comprising identifying an additional profile for an additional user that estimates the level of the additional user's technical sophistication at least in part by adjusting the additional profile for the additional user.

4. The computer-implemented method of claim 3, wherein adjusting the additional profile for the additional user comprises increasing the estimated level of the additional user's technical sophistication based on use of a command line interface.

5. The computer-implemented method of claim 3, wherein adjusting the additional profile for the additional user comprises increasing the estimated level of the additional user's technical sophistication based on use of system administrative tools.

6. The computer-implemented method of claim 3, wherein adjusting the additional profile for the additional user comprises increasing the estimated level of the additional user's technical sophistication based on presence of at least one of:
   development tools;
   scripting tools.

7. The computer-implemented method of claim 3, wherein adjusting the additional profile for the additional user comprises increasing the estimated level of the additional user's technical sophistication based on a ratio of time spent within a web browser to time spent within other user-installed applications.

8. The computer-implemented method of claim 1, further comprising determining that an additional identified behavior of an additional user does not indicate a security threat.

9. The computer-implemented method of claim 8, wherein determining that the additional identified behavior of the additional user does not indicate a security threat comprises determining that the additional user was physically present at an additional computing system during the additional identified behavior.

10. The computer-implemented method of claim 8, wherein determining that the additional identified behavior of the additional user does not indicate a security threat comprises determining that the additional user witnessed changes made by the additional identified behavior.

11. The computer-implemented method of claim 8, wherein determining that the additional identified behavior of the additional user does not indicate a security threat comprises determining that behavior similar to the additional identified behavior of the additional user occurred on other network computing systems during a same period of time as the additional identified behavior of the additional user.

12. The computer-implemented method of claim 8, wherein determining that the additional identified behavior of the additional user does not indicate a security threat comprises identifying a false positive.

13. A system for detecting security threats based on user profiles, the system comprising:
   an identification module, stored in a memory, that identifies:
      behavior by a user on a computing system that is potentially indicative of a security threat by identifying at least one of:
         use of an administrative tool that causes remote execution on other computing systems;
         execution of a network command that allows attackers to identify at least one of domain controllers and accounts with domain administrator credentials;
      a profile for the user that estimates a level of the user's technical sophistication at least in part by:
         accessing a history of behavior by the user;
         matching the user, by analyzing the history of behavior, to a group of non-administrators having a lower level of technical sophistication than a group of administrators;
   a comparing module, stored in the memory, that compares the identified behavior of the user with the estimated level of the user's technical sophistication;

a determination module, stored in the memory, that determines that the identified behavior of the user indicates a security threat at least in part by determining that the identified behavior is inconsistent with the estimated level of the user's technical sophistication associated with the group of non-administrators;

at least one physical processor that is coupled to the memory and that is configured to execute the identification module, the comparing module, and the determination module.

14. The system of claim 13, wherein the identification module identifies behavior by the user on the computing system that is potentially indicative of a security threat by identifying:

execution of a network command that allows attackers to identify at least one of domain controllers and accounts with domain administrator credentials.

15. The system of claim 13, wherein the identification module identifies an additional profile for an additional user that estimates the level of the additional user's technical sophistication by adjusting the additional profile for the additional user.

16. The system of claim 15, wherein the identification module adjusts the additional profile for the additional user by increasing the estimated level of the additional user's technical sophistication based on use of a command line interface.

17. The system of claim 15, wherein the identification module adjusts the additional profile for the additional user by increasing the estimated level of the additional user's technical sophistication based on use of system administrative tools.

18. The system of claim 15, wherein the identification module adjusts the additional profile for the additional user by increasing the estimated level of the additional user's technical sophistication based on presence of at least one of:

development tools;

scripting tools.

19. The system of claim 15, wherein the identification module adjusts the additional profile for the additional user by increasing the estimated level of the additional user's technical sophistication based on a ratio of time spent within a web browser to time spent within other user-installed applications.

20. A non-transitory computer-readable-storage medium comprising one or more computer-readable instructions that, when executed by at least one processor of a computing device, cause the computing device to:

identify behavior by a user on a computing system that is potentially indicative of a security threat by identifying at least one of:

use of an administrative tool that causes remote execution on other computing systems;

execution of a network command that allows attackers to identify at least one of domain controllers and accounts with domain administrator credentials;

identify a profile for the user that estimates a level of the user's technical sophistication at least in part by:

accessing a history of behavior by the user;

matching the user, by analyzing the history of behavior, to a group of non-administrators having a lower level of technical sophistication than a group of administrators;

compare the identified behavior of the user with the estimated level of the user's technical sophistication;

determine that the identified behavior of the user indicates a security threat at least in part by determining that the identified behavior is inconsistent with the estimated level of the user's technical sophistication associated with the group of non-administrators.

\* \* \* \* \*